June 23, 1970

R. K. VERMILLION 3,517,388

COMMON SOURCE MODULATION OF MULTIPLE COUNTERMEASURES TRANSMITTERS

Filed Jan. 6, 1961

INVENTOR.
RAYMOND K. VERMILLION
BY Wade Koontz
George D. Dalle
ATTORNEYS

United States Patent Office
3,517,388
Patented June 23, 1970

3,517,388

COMMON SOURCE MODULATION OF MULTIPLE COUNTERMEASURES TRANSMITTERS

Raymond K. Vermillion, 218 Edge Ave., Valparaiso, Fla. 32580

Filed Jan. 6, 1961, Ser. No. 81,202
Int. Cl. H04k *3/00*
U.S. Cl. 343—18 1 Claim

ABSTRACT OF THE DISCLOSURE

The output of a wide band noise generator is amplified and fed into two parallel cathode follower stages. The outputs of the cathode followers are then coupled to transmission lines whose lengths are equalized by means of variable capacitors. The signals are then used to modulate carrier waves and the resulting modulator outputs are transmitted over separate antennae.

Figure 1:
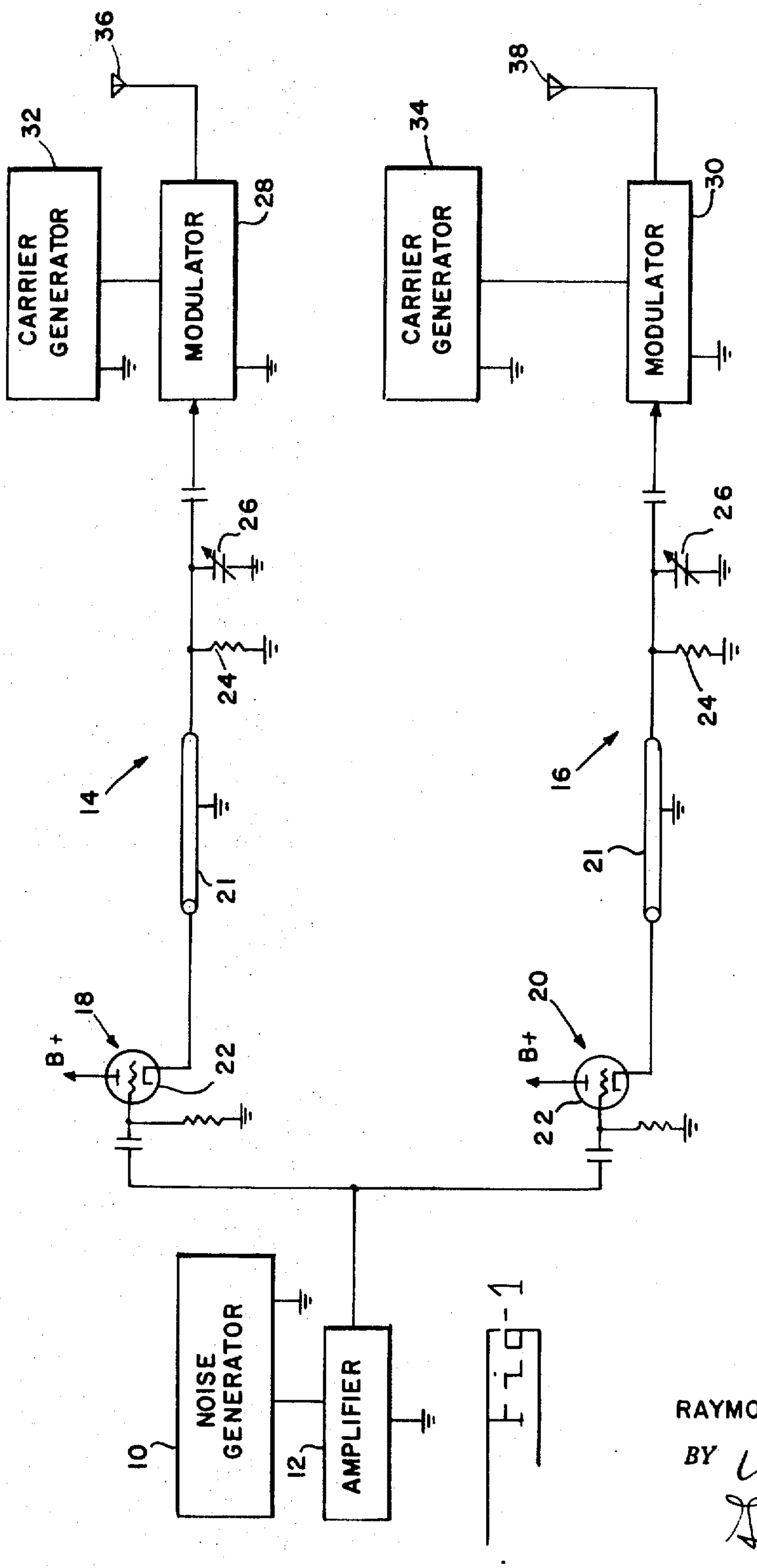

The invention described herein may be manufactured and used by or for the United States Government for governmental purposes without payment to me of any royalty thereon.

The invention relates to a radio receiver jamming system utilizing common noise source modulation of two or more jamming transmitters.

Conventional jamming transmitters employ noise modulation of the carrier to effect a complex modulation envelope. Because of the random nature of noise modulation, the probability of an in phase condition of two or more dissimilar side bands arriving at the receiver is extremely remote. Very little amplitude addition occurs then in the receiver demodulator stage as the result of the reception of two or more dissimilar noise side bands.

In accordance with the invention, two transmitters, each having a different carrier frequency, are modulated by a common noise source, the result being two dissimilar carriers modulated in phase with each carrier having upper and lower side bands. For the case in which one side band of each carrier lies within the response region of a victim receiver, noise modulation of the side band signals takes place at the same instant. Moreover, since the carrier frequencies are different and their phase relationship is of a random nature, intermodulation occurs between the spectrums of the noise-modulated side bands in the demodulator stage of the victim receiver. The effect of the intermodulation combines in the victim receiver with the coincident noise-modulated side band signals to produce a jamming signal which exceeds the simple vector sum of the side band signals and which may be expressed as follows:

$$E_t=\sqrt{E_1^{2.25}+E_2^{2.25}}$$

where $E_t$ is the amplitude of the resultant signal masking the enemy receiver and $E_1$ and $E_2$ are the respective side band signals entering the receiver.

An increase in effective bandwidth of the jamming signals is also realized from the common noise source modulation system. The increase is achieved by the high frequency components of adjacent side bands adding when the carriers are widely separated in frequency.

It is an object of the invention to provide a radio receiver jamming system which produces an increased jamming signal output from a victim receiver demodulator stage.

It is another object of the invention to provide a radio receiver jamming system including two or more transmitters, with dissimilar carrier frequencies, capable of producing amplitude addition in the receiver of the dissimilar side bands originating in the transmitters.

It is a further object of the invention to provide a radio receiver jamming system including two or more transmitters which produces increased jamming signal output from a victim receiver demodulator stage and an increased effective bandwidth in the multiple jammer operation.

Other objects, novel features, and advantages of this invention will become apparent upon consideration of the embodiments illustrated in the accompanying drawing and hereinafter described.

Figure 2:
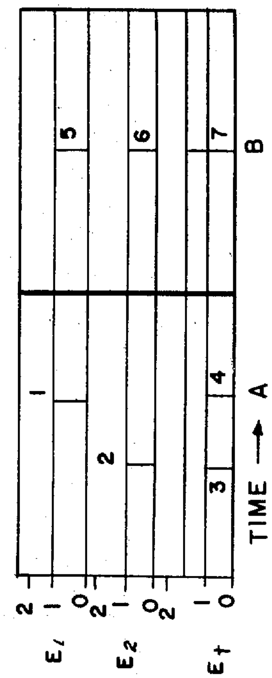

In the drawing:

FIG. 1 is a schematic diagram illustrating the novel radio receiver jamming system; and FIG. 2 is a composite graph showing the resultants of detected noise pulses as they appear at the output of the demodulator stage of a victim receiver.

Referring now to FIG. 1, there is shown a noise or other suitable signal generator 10. The noise genera'or 10 can be of any one of several devices known to the art for generating a signal which includes the random interplay of a broad spectrum of frequencies.

The noise signal generated in the noise generator is amplified in amplifier 12 and simultaneously applied to two jamming transmitters 14 and 16. The noise signal is applied to each transmitter 14 and 16 through cathode follower coupled stages 18 and 20, respectively. Each cathode follower acts as an isolating stage to present a high input resistance to amplifier 12 and low output resistance for its load. Each cathode follower stage includes a transmission line, such as a shielded or coaxial cable 21, located in the cathode circuit between the cathode of the tube 22 and the load resistor 24. A variable capacitor 26 is employed as coaxial line length compensators, providing a means of equalizing each branch of the distribution circuit.

The noise signal is applied to the modulator stages 28 and 30 of the jamming transmitters 14 and 16, respectively. Dissimilar R.F. carrier frequencies are produced by carrier generators 32, 34 and the respective R.F. carriers sent to modulators 28 and 30. Each R.F. carrier is modulated by the common noise signal and the resultant output of each modulator is an amplitude-modulated wave with noise modulation representing the sum of the carrier and its side-band frequencies. The modulated waves are then transmitted by the respective antennas 36 and 38.

The manner in which the common source modulation of multiple countermeasures transmitters affects a victim receiver is more readily understood by reference to FIG. 2. Portion A of the FIG. 2 graphically illustrates the resultants of detected noise pulse where conventional jamming transmitters are used. The B portion shows graphically the novel effect produced by the present invention in detected noise pulses.

The random nature of noise modulation used in conventional jamming transmitters makes the probability of two or more dissimilar side bands arriving at the receiver inphase quite small. The resultants of detected noise pulses originating from separate noise sources as they appear at the output of the demodulator stage of the receiver are shown in portion A as 1 and 2. The resultant demodulator output which is indicated as 3 and 4 shows no amplitude addition.

Where two transmitters have dissimilar carriers modulated by a common noise or other suitable signal source, the detected noise pulses in the demodulator stage of a victim receiver are shown in portion B at 5 for one side band and at 6 for the other side band. The resultant demodulator output at 7 results in a sum of the two sideband amplitudes exceeding the simple vector sum.

The invention has been described using a pair of transmitters, however, it is clear that additional amplitude addition can be obtained by the common source modulation of more than two transmitters.

I claim:

1. A countermeasures transmitting system for jamming a distant victim receiver comprising: two sources of carrier waves having different frequencies, two bi-terminal modulators each fed at one terminal by the waves from one of said sources and having separate antennas for radiating energy in the direction of said receiver, a pair of transmission lines each coupled at one end thereof to the other terminals of said modulators adjustable capacitor means coupled to each of said transmission lines for compensating for line length changes of said transmission lines whereby the lengths of said lines may be equalized, a pair of cathode followers each having its cathode coupled to the other end of one of said transmission lines, and random noise generating means coupled to said cathode followers for simultaneously modulating said carrier waves to produce in said receiver a resultant jamming signal $E_t$ equal to $$\sqrt{E_1^{2.25}+E_2^{2.25}}$$

where $E_1$ and $E_2$ are side band components of said different carrier waves resulting from simultaneous common noise modulation.

References Cited

UNITED STATES PATENTS

| | | | |
|---|---|---|---|
| 2,428,582 | 10/1947 | Peterson et al. | 250—17.12 |
| 3,035,169 | 5/1962 | Griffith | 325—158 |
| 2,958,862 | 11/1960 | Rey | 343—14 |
| 2,545,511 | 3/1951 | Brinkley | 325—154 |

RODNEY D. BENNETT, Jr., Primary Examiner

B. L. RIBANDO, Assistant Examiner

U.S. Cl. X.R.

325—132, 158